(12) United States Patent
Bigelow et al.

(10) Patent No.: US 11,061,888 B2
(45) Date of Patent: Jul. 13, 2021

(54) METHOD FOR BACKFILLING GRAPH STRUCTURE AND ARTICLES COMPRISING THE SAME

(71) Applicant: INTERNATIONAL BUSINESS MACHINES CORPORATION, Armonk, NY (US)

(72) Inventors: Alex R. Bigelow, Salt Lake City, UT (US); Megan Monroe, Somerville, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 287 days.

(21) Appl. No.: 16/124,279

(22) Filed: Sep. 7, 2018

(65) Prior Publication Data

US 2019/0018875 A1    Jan. 17, 2019

Related U.S. Application Data

(63) Continuation of application No. 15/371,976, filed on Dec. 7, 2016, now Pat. No. 10,114,856, which is a continuation of application No. 14/951,975, filed on Nov. 25, 2015, now Pat. No. 9,569,558.

(51) Int. Cl.
  *G06F 16/901* (2019.01)
  *G06F 16/9535* (2019.01)
  *G06F 16/23* (2019.01)
  *G06F 16/25* (2019.01)

(52) U.S. Cl.
  CPC ........ *G06F 16/2379* (2019.01); *G06F 16/252* (2019.01); *G06F 16/9024* (2019.01); *G06F 16/9535* (2019.01)

(58) Field of Classification Search
  CPC .............. G06F 16/2379; G06F 16/252; G06F 16/9024; G06F 16/9535
  See application file for complete search history.

(56) References Cited

U.S. PATENT DOCUMENTS

| | | | |
|---|---|---|---|
| 9,330,138 B1 * | 5/2016 | Shankar | ............... G06F 16/282 |
| 9,569,558 B1 | 2/2017 | Bigelow et al. | |
| 10,073,882 B1 * | 9/2018 | Gupta | ..................... G06F 16/33 |
| 2006/0031203 A1 * | 2/2006 | Rosenbaum | ........ G06F 16/9024 |
| 2007/0011659 A1 * | 1/2007 | Venolia | ............... G06F 16/9038 717/127 |
| 2010/0211924 A1 * | 8/2010 | Begel | .................. G06F 16/9024 717/101 |

(Continued)

OTHER PUBLICATIONS

List of IBM Patents or Patent Applications Treated As Related; (Appendix P), Filed Sep. 7, 2018; pp. 1-2.

Primary Examiner — Cheyne D Ly
(74) Attorney, Agent, or Firm — Cantor Colburn LLP; Anthony Curro

(57) ABSTRACT

Disclosed herein is system for updating a graph-based data structure comprising a processor that hosts an algorithm to incrementally update underlying data and abstractions for a graph-based data structure based on popular user selections; a user interface that is in two-way operative communication with the processor; where the user interface is operative to present graph-based data structures to a user for updating; and a memory database that is in communication with the processor and is adapted to receive, store, and recall data to/from the processor.

15 Claims, 9 Drawing Sheets

(56) References Cited

U.S. PATENT DOCUMENTS

2011/0225199 A1* 9/2011 Marathe ............... G06Q 10/10
                                                            707/781
2014/0118355 A1* 5/2014 Vassilvitskii ......... G06T 11/206
                                                            345/440
2017/0161318 A1   6/2017 Bigelow et al.

* cited by examiner

METHOD FOR BACKFILLING GRAPH STRUCTURE AND ARTICLES COMPRISING THE SAME

DOMESTIC PRIORITY

This application is a continuation of and claims priority to U.S. patent application Ser. No. 15/371,976, filed on Dec. 7, 2016, entitled "METHOD FOR BACKFILLING GRAPH STRUCTURE AND ARTICLES COMPRISING THE SAME", which is a continuation of and claims priority to U.S. patent application Ser. No. 14/951,975, filed on Nov. 25, 2015, entitled "METHOD FOR BACKFILLING GRAPH STRUCTURE AND ARTICLES COMPRISING THE SAME", and issued as U.S. Pat. No. 9,569,558 on Feb. 14, 2017. The entire contents of the aforementioned applications are incorporated herein by reference.

BACKGROUND

This disclosure relates to a method for backfilling graph structure and to articles comprising the same. In particular this disclosure relates to a method for generating new graph-based data structures and adding them to existing graph-based data structures based on queries posed by users of the system over a period of time.

Graph-based data systems provide information in form of nodes and edges in a wide variety of data systems such as, for example, those used in hospitals, police and detective databases, university systems, employment databases, city service databases, and the like. Graph-based data was once thought of as a fallback option for data that could not be manipulated into a relational data system. However, graph-based data structures and graph-based data systems are now emerging as the preferred storage method, not only for overtly networked systems, such as social networks and citation networks, but also for biological systems, traffic patterns and, well, all of human knowledge.

Graph-based data structures are therefore emerging as an intuitive and flexible means of encoding a wide range of information. From hospital data systems to social networks, notions of interaction, correlation, and influence are increasingly being represented by nodes and edges.

The FIG. 1(A) shows how moving along the nodes and edges of a graph-based structure can be used to support a variety of different queries that users may need to execute. The term "graph-based" data structure as used herein refers to a data structure comprised of nodes and edges. Nodes represent entities such as people, businesses, accounts, or any other item one might want to keep track of. Edges are the lines that connect nodes to nodes or alternatively, nodes to properties and they represent the relationship between the two. Meaningful patterns emerge when examining the connections and interconnections of nodes, properties, and edges.

For example, in the data system for a large hospital, a doctor 102 might want to find out which other doctors his patients are seeing. By first finding himself 102 in the data system (see step (a)), he can then pivot out to all of the patients 104 associated with him (see step (b)), and then pivot back to all of the doctors 106 and 108 associated with those patients (see step (c)). A pivot is the process of selecting an initial set of seed nodes (in this case "the doctor 102") in the graph, and then swinging out to the neighboring nodes (in this case "all of the patients 104") that are connected to it. This produces subgraph data consisting of both the seed node (102) and neighbor nodes (104). The term "pivot" comes from the fact that this operation can be chained together, with the neighbor nodes (104) from the previous step serving as the seed nodes in the present step to determine another set of neighbor nodes (106 and 108).

In the FIG. 1, the lines (shown in bold) connecting the doctor 102 to his patients 104 are called edges. These bold lines represent a first set of edges 105. The lines connecting the patients 104 to their other doctors 106 and 108 are shown in dotted lines and these represent a second set of edges 107. While the exemplary graph shown in the FIG. 1 is helpful to the doctor to determine which other doctors service some of his patients, not all users of the system will find the graph-based data system easy to access and even fewer will find the means (e.g., querying the system using keywords approved by the system) to access the structure and to obtain all information available to them from the structure.

The overall utility of a graph-based data structure database can depend heavily on how well the data abstraction matches the queries that will ultimately be run against it. Abstraction is defined by the level of complexity on which a person interacts with the structure. This is often because the people who determine the abstractions for the graph-based data structures are often technology experts, not experts in the data itself or people who will be working most directly with the data (domain experts).

The people creating the abstractions might choose an abstraction that does not fit with the tasks and queries that need to be accomplished. Or perhaps those tasks and queries will change over time, and the abstraction simply goes out of date. In either case, changing the underlying data abstraction can involve reloading the entire data structure or executing complex queries that require close coordination between technology experts and the domain experts.

It is therefore desirable to have a graph-based data structure where abstractions are developed and continuously improved based on the type and population of queries that the system is subjected to over time by users and not just by the people that create the abstractions.

SUMMARY

Disclosed herein is system for updating a graph-based data structure comprising a processor that hosts an algorithm to incrementally update underlying data and abstractions for a graph-based data structure based on popular user selections; a user interface that is in two-way operative communication with the processor; where the user interface is operative to present graph-based data structures to a user for updating; and a memory database that is in communication with the processor and is adapted to receive, store, and recall data to/from the processor.

Disclosed herein too is a method comprising traversing a graph-based data structure comprising edges and nodes along at least one edge or node on a user interface in a system comprising a processor that hosts an algorithm to incrementally update underlying data and abstractions for a graph-based data structure based on popular user selections; the user interface; where the user interface is in two-way operative communication with the processor; where the user interface is operative to present graph-based data structures to a user for updating; and a memory database that is in communication with the processor and is adapted to receive, store, and recall data to/from the processor; and incrementally updating the graph-based data structure.

Disclosed herein too is a computer program product comprising a non-transitory storage medium readable by a processing circuit and storing instructions for execution by the processing circuit for performing a method comprising traversing a graph-based data structure comprising edges and nodes along at least one edge or node on a user interface in a system comprising a processor that hosts an algorithm to incrementally update underlying data and abstractions for a graph-based data structure based on popular user selections; the user interface; where the user interface is in two-way operative communication with the processor; where the user interface is operative to present graph-based data structures to a user for updating; and a memory database that is in communication with the processor and is adapted to receive, store, and recall data to the processor; and incrementally updating the graph-based data structures.

DETAILED DESCRIPTION

Disclosed herein is a continuously self-improving system for graph-based data structures (also interchangeably referred to herein as the "system") that develops new abstractions for the graph-based data structure based on user interactions with the system. Disclosed herein too are methods by which the graph-based data structure continuously updates its abstractions based on user interactions with the system. The system disclosed herein queries users as they traverse the data structure along its nodes and edges and uses the answers to extract data for the user, to generate new abstractions and to update old abstractions. The movements and the queries of the user are recorded and aggregated and then used to algorithmically determine improvements to existing data abstractions or to generate new abstractions and new graph-based data structures. These improvements can take the form of adding new edges to the graph-based data structure, reformulating node attributes as nodes themselves, converting nodes to edges and vice versa, to list a few improvements. The end result is a graph-based data structure that can evolve its underlying abstractions to better suit the tasks and queries that data already present in the system can answer.

The graph-based data structure detailed herein provides the user with a means of incrementally, but freely moving through the graph data. By using the pivot one can select an initial set of seed nodes in the graph data, and then swing out to the neighboring nodes that are connected to the set of seed nodes to traverse the graph data. This produces a subgraph consisting of both the seed and neighbor nodes. These pivots swing out to all of the neighboring nodes, or only to nodes of a certain category, where the user can perform a wide range of filtering on the subgraph before the next pivot is performed. For example, in a medical database, a user might filter a list of all the doctors down to just the female doctors and then pivot out to see their patients. Using the pivot operation, users can move across existing edges in the graph to formulate queries, extract data, and understand how elements are connected. The graph-based data structure observes these sequences of pivots and filtering's across the entire user base, and identifies common patterns of usage. When a pattern is executed frequently, the system automatically adapts the underlying data structure to better support that operation.

Figure 2:
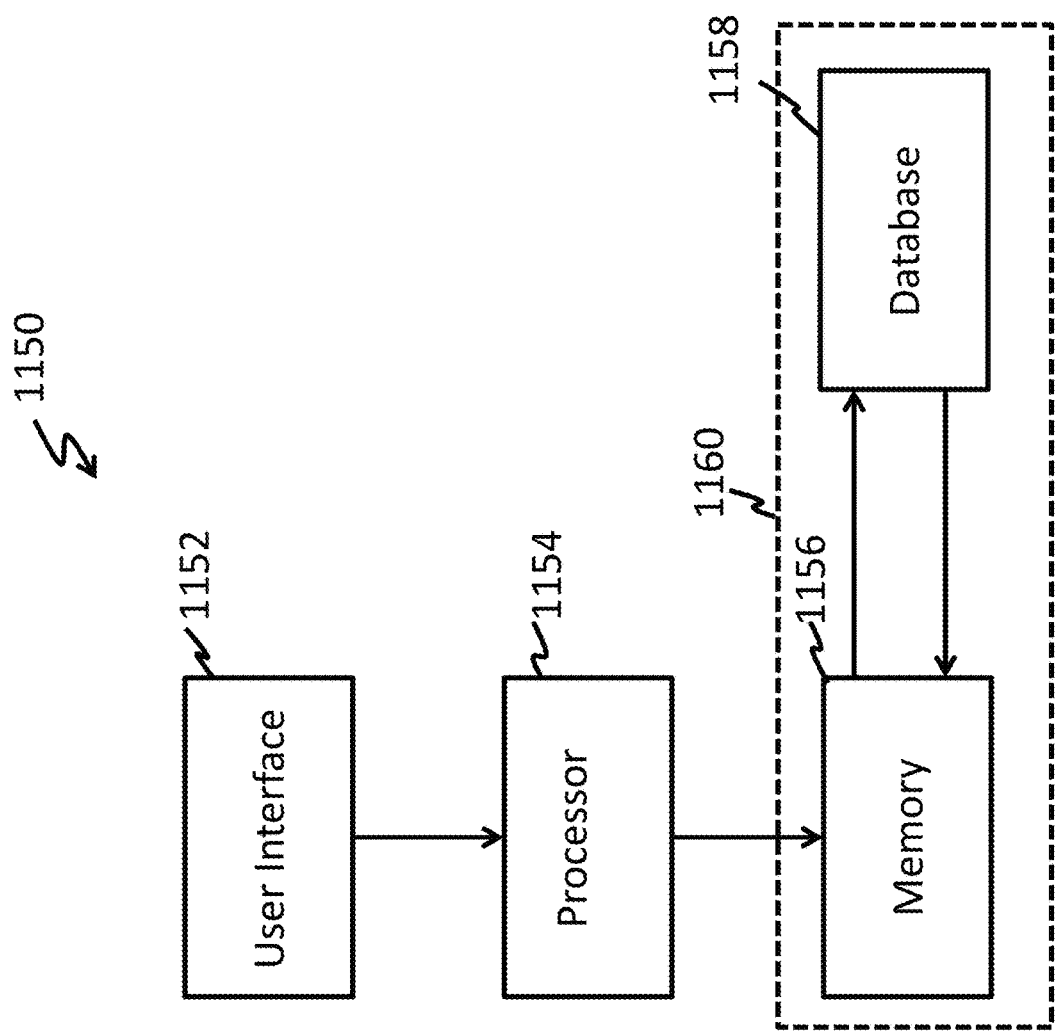
FIG. 2 is an exemplary schematic depiction of the components of the graph-based data structure.

With reference now to the FIG. 2, a system 150 for hosting and deploying the graph-based data structure comprises a user interface 152, a processor 154, and a memory database 160 that comprises a memory 156 and a database 158.

The user interface 152 is in two-way operative communication with the processor 154 that hosts an algorithm to incrementally update the underlying data and abstractions in the graph-based data structure. The user interface 152 can comprise a monitor, a speaker, or any other devices that permit speech to text and/or text to speech communication with the graph-based data structure. The user interface 152 may provide queries to the user in text and/or speech format and may display the generated text resulting from the speech-to-text conversion to facilitate interaction with the system 150. The user interface 152 also permits the user to correct the text and to provide other contextual details to the system either via an aural feedback or a textual feedback loop. The user interface may be in communication with the system via one or more networks such as, for example, a wireless cellular network, a wireless local area network (WLAN) or Wi-Fi network, a Third Generation (3G) mobile telecommunications network, a private network such as an intranet, a public network such as the Internet, or some combination thereof.

Figure 1:
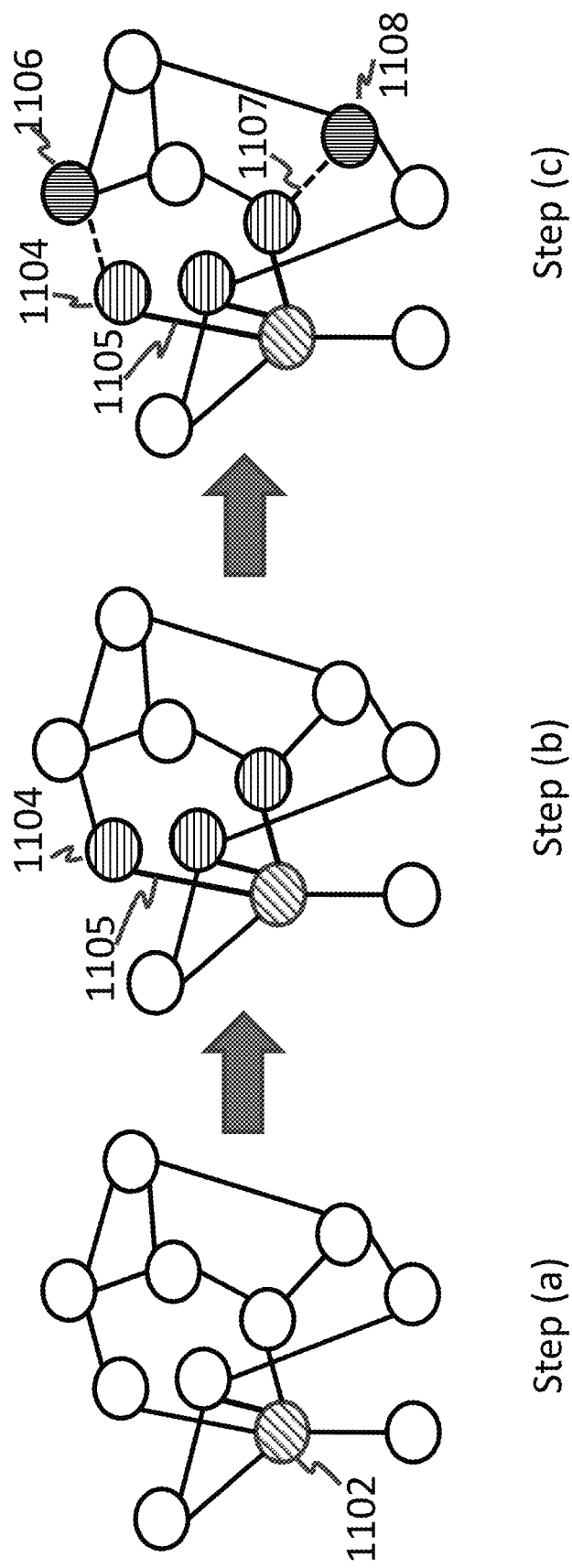
FIG. 1 shows how a graph-based data structure with nodes and edges may be used to determine a variety of different options available to a user.

The memory 156 in conjunction with the database 158 stores abstractions and the resulting graph and subgraph-based data structures. It also stores queries that are asked of the user and queries that the user may ask as he/she traverses a graph. The memory 156 is in communication with the processor 154 and adapted to receive, store, and recall data to the processor 154. The processor hosts an algorithm that is operative to permit updates and modifications to graph-based data structures and to abstractions, upon which the graph-based data structures are created, based broadly on changes initiated by users. The memory 156 is in operative communication with the database 158 and adds corrections or changes to the database or alternatively gets new data structures and abstractions from the database 158. The memory 156 stores unused queries, users patterns of access and works cooperatively with the processor 154 to develop new queries, abstractions and graph-based data structures. In an embodiment, the memory 156 and the correction database 158 can be part of a single system, i.e., they can be a part of a single unitary device 160 as seen in the FIG. 1(B).

The memory 156 may be provided with an array of records and parameters that can be accessed and utilized in order to produce the graph and subgraph-based data structures. An exemplary system for accessing graph-based data structures and transforming nodes and edges of a particular graph-based data structure based on new methods of using the system is provided in the FIG. 3.

Figure 3:
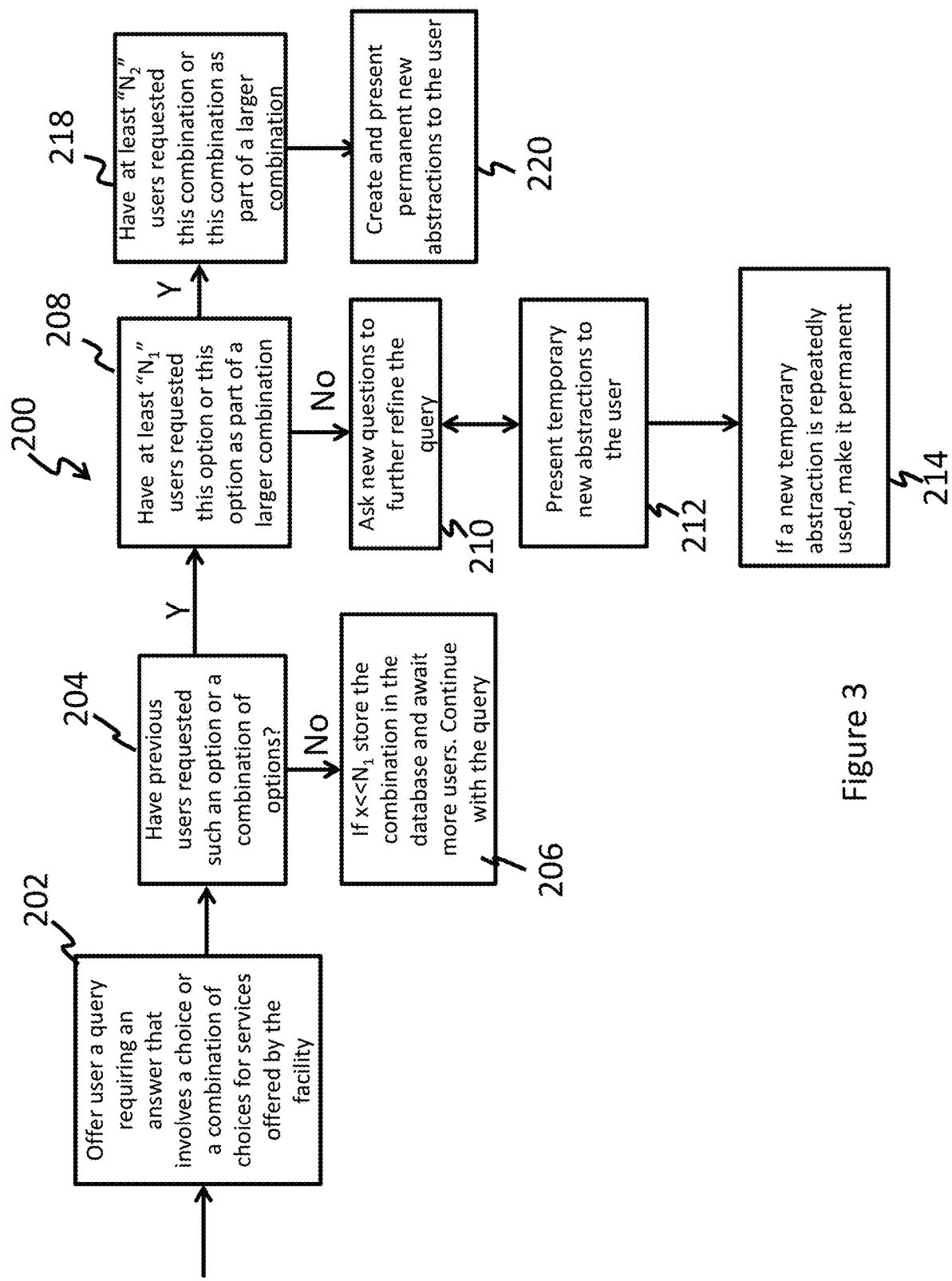
FIG. 3 is a flow diagram that details one exemplary sequence of events by which the graph-based data structure uses movements and queries of the use to generate new abstractions.
Figure 4:
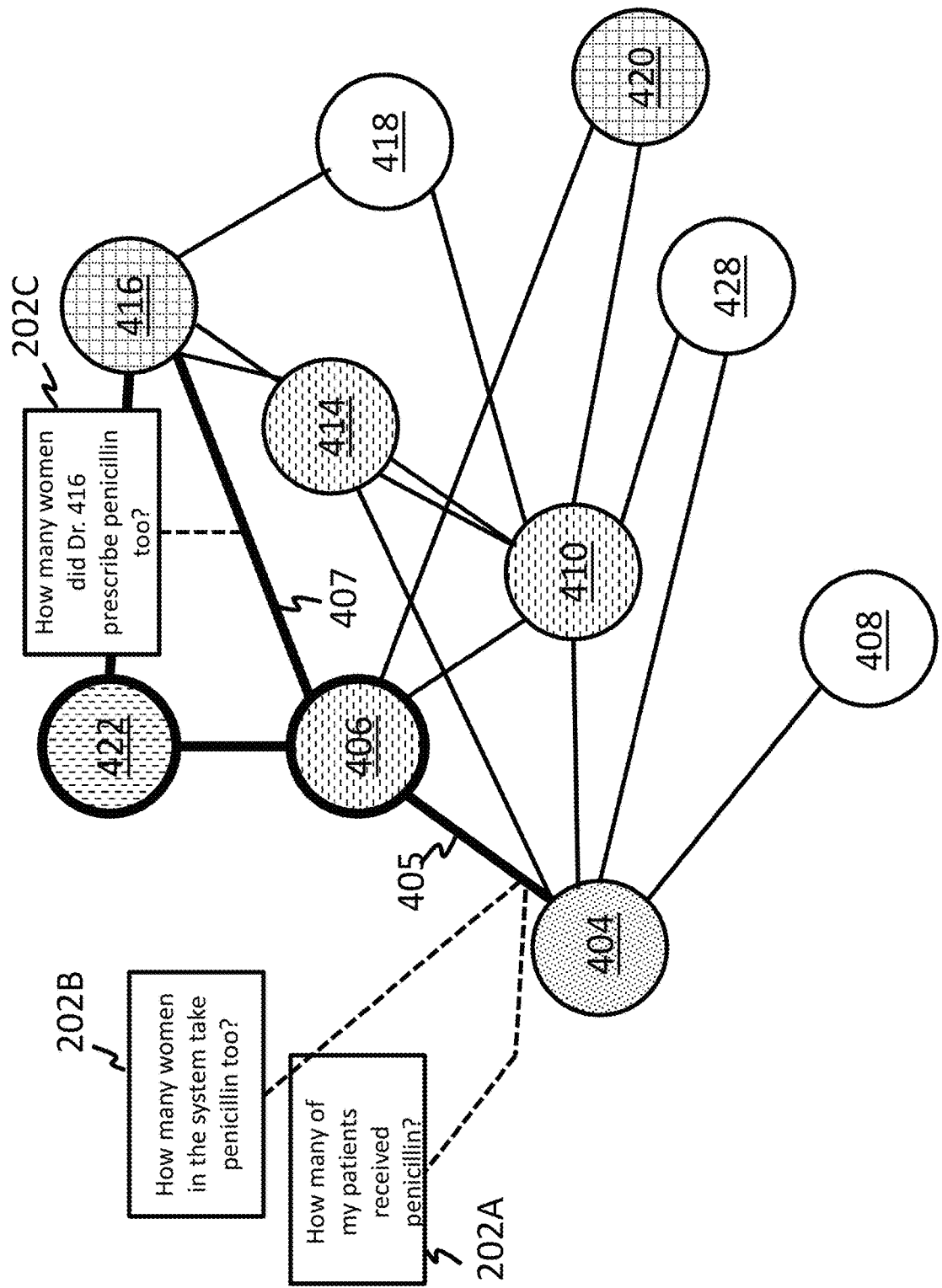
FIG. 4 depicts one embodiment of a presentation of a graph-based data structure that may be presented to the user as a result of new abstractions generated by the system.

FIGS. 3 and 4 detail one exemplary sequence of events by which the graph-based data structure 200 uses movements and queries of the use to generate new abstractions. The FIG. 3 is a flow diagram (an algorithm) that depicts how the system 200 interacts with the user. The FIG. 4 depicts a graph-based data structure that shows how moving along the edges or to the nodes of the data structure may be used to make further inquiries of the user to develop new abstractions and new graph-based data structures that make use of the system easier. It is to be noted that the FIGS. 4, 5 and 6 in this disclosure represent what is happening in the underlying data structure and not necessarily what the users are seeing on the user interface. There are many possible graphical interfaces that would allow users to specify queries against the underlying data structure, but the main idea behind this invention is that—regardless of what the user interface is—queries are being used to modify the data structure, not necessarily just the interface.

With reference now to the FIG. 3, when a user activates the graph-based data structure 200, he or she may enter his or her name into the database via a user interface if the user has previously interacted with the system 200. It is to be noted that the system is not restricted just to prior users but can be activated by new users as well. New users may be requested to provide some information into the system 200 to facilitate the activation of the queries (not shown).

Upon activating the system 200, the system may optionally present queries 202 to the user. The FIG. 3 is broadly based on the principle that the graph and the queries presented to the user (for the purposes of developing further abstractions in the system 200) are dependent upon the amount of use of the queries made by preceding users and by the manner in which users traverse the graph-based data structure looking for additional information. In short, if a query is particularly popular with users, the data obtained from the answers to this query are more likely to be used to update the abstractions and the graph-based data structure than another query that is not as popular with the users. In another embodiment, if a plurality of users navigate a particular graph-based data structure to find desired information using a particular combination of nodes, edges and pivots, then the abstractions for the graph data system are updated to reflect this particular combination. When another user seeks to find the desired information, the updated graph-based data structure presented to the new user is more intuitive than the old graph-based data structure and this makes finding the information more easy.

For example, if a particular query results in a particular option being chosen N1 times by a plurality of users, the system may develop additional queries around this particular option. It may also start to develop new graph-based data structures around this particular option and present them to a limited number of users for beta-testing. On the other hand, if a particular query results in a particular option being selected N2 times, where N2 is greater than N1, then the system presents the next user with an already developed graph-based data structure that is the result of new abstractions generated from queries and options selected by the previous N2 users. Alternatively, if very few users (x in number) chose a particular option, then the option is saved to the memory database and is offered to addition users for a period of time. In an embodiment, x is far less than N1 and as x approaches N1, the system may start to develop additional queries around the option and may begin graph-based data structure development for beta-testing with further users of the system 200.

The queries 202 (see FIGS. 3 and 4) may cause the user to make a choice of the data that he/she would like to access. Some users who are already familiar with the system 200 may make their choices known to the system as soon as they sign on and may therefore not have to be presented with the initial queries. While only a single query 202 is shown in the FIG. 3, the system may make a plurality of queries such as 202A, 202B, 202C, and so on (see FIG. 4). The user can stop the queries whenever he/she desires. The queries may usually require an answer from the user that involves selecting an option or a combination of options available from the system 200. Based on the option selected by the user, the system 200 may present a new graph-based data structure to the user.

When, for example, doctor 404 in the FIG. 4 activates the system it displays a seed node 404 that pertains to him. He now queries the system as to how many female patients he has. The system displays a graph-based data structure having 5 female patients to him as neighboring nodes—406, 408, 410, 414 and 428. Connecting lines (edges) represents connections between the nodes (406, 408, 410, 414 and 428) representing his patients and the node 404 that represents him. The doctor 404 now queries the system 200 about other doctors that his female patients are seeing. The graph-based data structure is updated with new nodes 416 and 420 that represent the doctors that his female patients are seeing. By pivoting from one set of nodes (the female patients) to another set of nodes (their doctors), the doctor 404 is able to traverse the system.

Another patient 418 is also seeing doctor 416. Doctor 404 is now desirous of determining the treatment his patients are getting from the other doctors 416 and 420. As he moves along edge 405 from his node 404 to node 406 that represents one his patients, the system 200 begins querying him. Query 202A (see FIGS. 3 and 4) asks him if he is interesting in knowing how many of his women patients are taking antibiotics (penicillin) while query 202B asks him whether he wants to know how many women in the system 200 take antibiotics (penicillin) too. If the doctor chooses "yes" to question 202A, then nodes 406, 410 and 414 are immediately colored indicating that three of his female patients 406, 410 and 414 are taking antibiotics. If he answers "yes" to query 202B, then the system adds additional women to the graph in the form of a node—422. All the nodes representing women who have received antibiotics from the doctors in the system 200 have edges 405 and 407 (shown in bold) connecting them to node 416 and node 404 because these doctors have both prescribed antibiotics. Doctor 404 can now traverse the edge between node 406 (his patient 406) and node 416 (doctor 416) along edge 407. During this traversal, the system may query him once again (see query 202C in the FIG. 3) as to whether he wants to know how many of these women doctor 416 has prescribed antibiotics too. If he answers yes, the system 200 highlights nodes 406 and 422 (see bolded circles) as being patients that doctor 416 prescribed antibiotics to. It is to be noted that nodes and edges described herein pertain to the underlying data structure and not to the graphical data seen on the screen of the user interface.

Alternatively, as doctor 404 traverses the edge 405 between nodes 404 and 406, he may want to query the system 200 about some other issues pertaining to nodes 406 and 416. The doctor 404 may want to know which insurance companies pay for antibiotics and how much they pay. These queries (not shown) may be stored in the system and aggregated for further use in developing either additional queries, abstractions or graph-based data structures. Doctor 404 may also perform filtering steps to make further determinations of other features of his patients. For example, he may want to know which of his female patients who have taken antibiotics are over 50 years of age.

By using a combination of pivots and filtering steps, making inquiries and answering queries the doctor 404 enables the graph-based data structure 200 to make new abstractions which result in new data structures that can help future users easily navigate the data structure and derive pertinent information in a timely manner.

With reference now to the FIGS. 2 and 3, if a user selects an option, the system 200 examines the memory database 158 to determine if previous users have requested such an option, as shown at block 204. If the answer is yes the system 200 moves to step 208 where it determines if at least N1 users have requested this exact option or have requested this option as part of a bigger combination of options. Step 208 and those steps 210 212 and 214 that depend from it will be detailed later.

If the answer at step 204 is "no", then the system 200 tries to determine if the number (x) of a particular option chosen by the users is far below a certain threshold number (N1). If so, then the option is stored in a memory database 206 of the system 200. In other words, if x<<N1, the option is stored in the memory database and reused as a query without developing any new abstractions based on it. As seen previously (with respect to the FIG. 3) as the user moves along the edge of the graph-based data structure more queries are presented to the user. Each of these queries is stored in the memory of the database and reused if x<<N1. If the number (x) of choices for a particular query exceeds N1 but is less than N2, where N2 is greater than N1, then the system moves to step 208.

If the answer to the query in step 208 is "no", then the system 200 attempts to ask new queries (see step 210) based around the old query to further refine the query. The system 200 may solicit help from users to refine the query. The system performs step 210 because "x" is tending to "N1". In other words, the answers to queries begin to determine that there is appreciable interest in this particular query or line of reasoning from the various users of the system. New queries based on temporary new abstractions may also be presented to users in step 210. Step 210 and 212 can interact with each other. In other words, if the system 200 determines that the temporary abstractions of step 212 are gaining traction with users then it can present new queries in step 210 to test which queries and graph-based data structures are being populated by the users. In step 214, if the system notes that a particular graph-based data structure is being repeatedly used it can update the abstractions and make this new graph-based data structure permanent—in other words, the new graph-based data structure can be presented to users who have an interest in this particular line or reasoning.

In step 208 if the answer to the query "have at least N1 users requested this exact option or have they requested this option as part of a combination with other options?" is yes then the system moves on to step 218 where it checks to see if more than N2 users are availing of this option. N2 is always greater than N1 and represents another threshold number. If more than N2 users are using a particular option then the abstraction is made permanent (see step 220) and a new graph-based data structure based on this abstraction is always presented to a user desirous of obtaining information from the system. In this example, it should be noted that x, N1 and N2 are integers.

In summary, if a large set of users of the graph-based data structure explore a particular data structure in a hitherto unused manner, the system develops new abstractions and consequently new data structures to enable future users to better navigate the system and extract information contained therein.

While the criteria used in the FIG. 3 to develop new graph-based data structures is based on the number of users who choose a particular option versus other available options, other criteria may also be used to update graph-based data structures. Exemplary criteria can be the rate of usage of a particular option between particular time periods (e.g., the hours of 11:00 AM to 3:00 PM), the activity during a particular part of the year (e.g., the summer versus the winter), degree of difficulty of course work (e.g., in a university or school). Other criteria not listed here can also be used to create thresholds for updating the data structures.

In an embodiment, it may also be possible to identify expert users (perhaps users who understand both technology and the particular domain that the data pertains to) and place a higher value on their patterns of use. Alternatively, if there is some measure of a user's success within the system (whether they found what they were looking for in a given time period), the patterns of more successful users can be assigned a higher value. These values are the aggregated and used in making a determination of whether to update the graph-based data structure.

Figure 5:
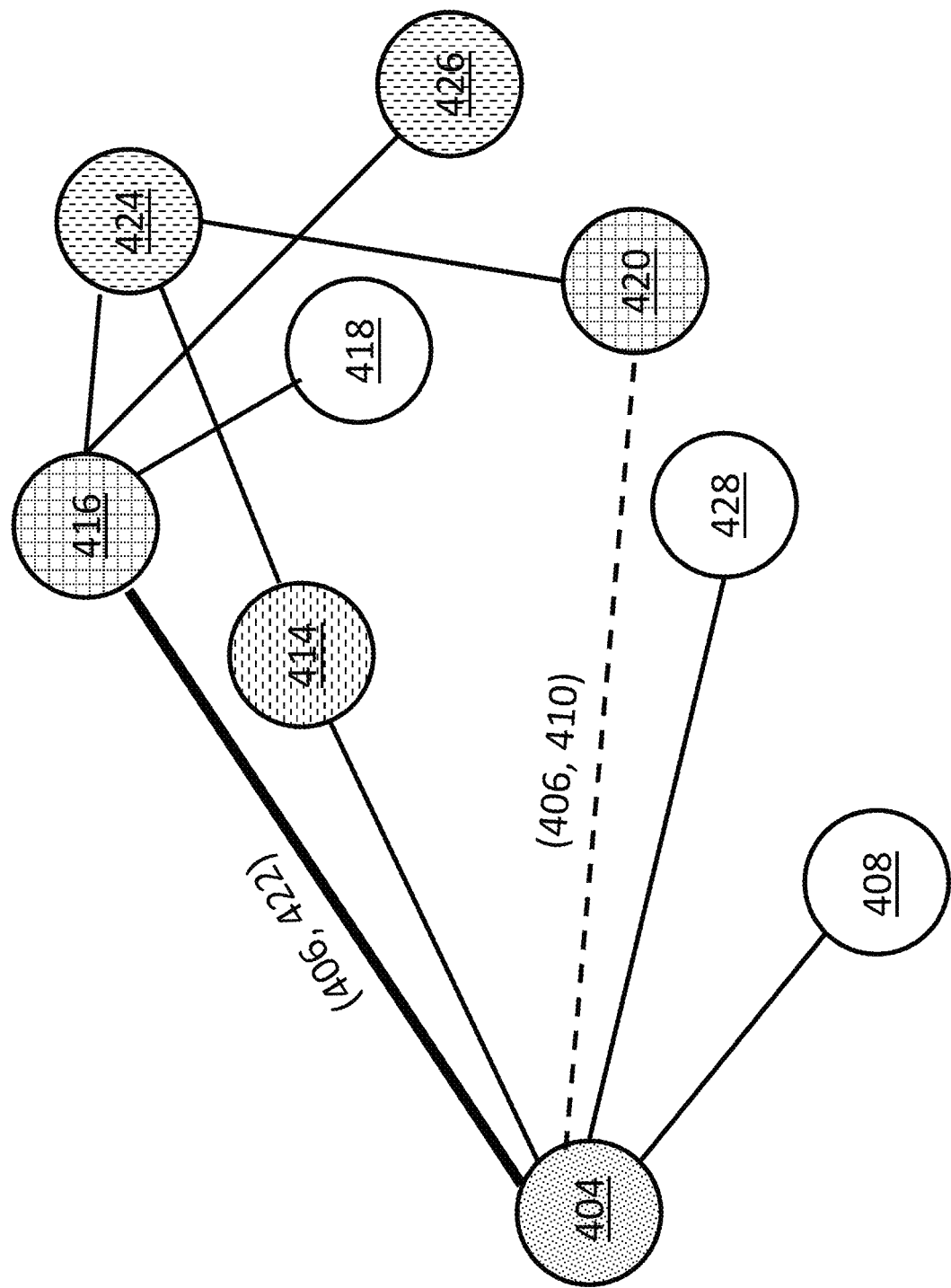
FIG. 5 depicts an embodiment of the FIG. 3 where the criteria for edges is changed.

In some situations it may be desirable to rearrange the relationship between nodes and edges so as to make the graph-based data structure more intuitive and to make searching for relationships in a particular course of action more easy. One manner of accomplishing this is by turning some of the nodes into edges. FIG. 5 reflects one such iteration. The FIG. 5 uses the graph-based data structure from the FIG. 4. In the FIG. 4, patients 406 and 410 are connected to doctors 404, 416 and 420. In addition, patients 406 and 422 have been prescribed antibiotics by doctors 404 and 416.

By flipping the nodes into edges of the graph-based data structure and removing the extraneous edges that do not play any role in this particular graph-based data structure, the data structure can be simplified to that shown in the FIG. 5. In the FIG. 4, the bold edge labelled (406, 422) connects nodes 404 and 416 while the dotted edge (406, 410) connects nodes 404 and 420 because they are serviced by doctors 404 and 420. The graph-based data structure shown in the FIG. 4 is substantially simpler than that seen in the FIG. 3. The bolded edge labelled (406, 422) indicates that patients 406 and 422 have received antibiotics from doctors 404 and 416.

Figure 6:
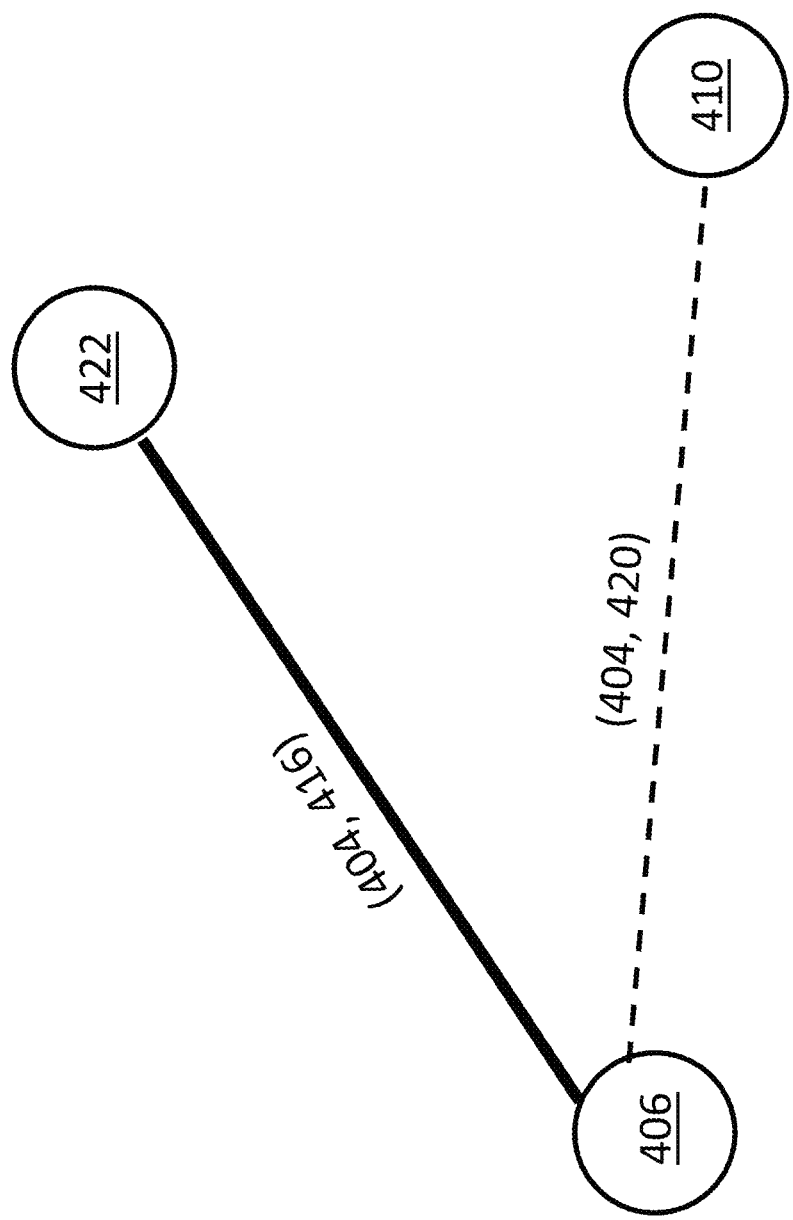
FIG. 6 depicts an embodiment of the FIG. 3, where nodes and edges are flipped.
Figure 7:
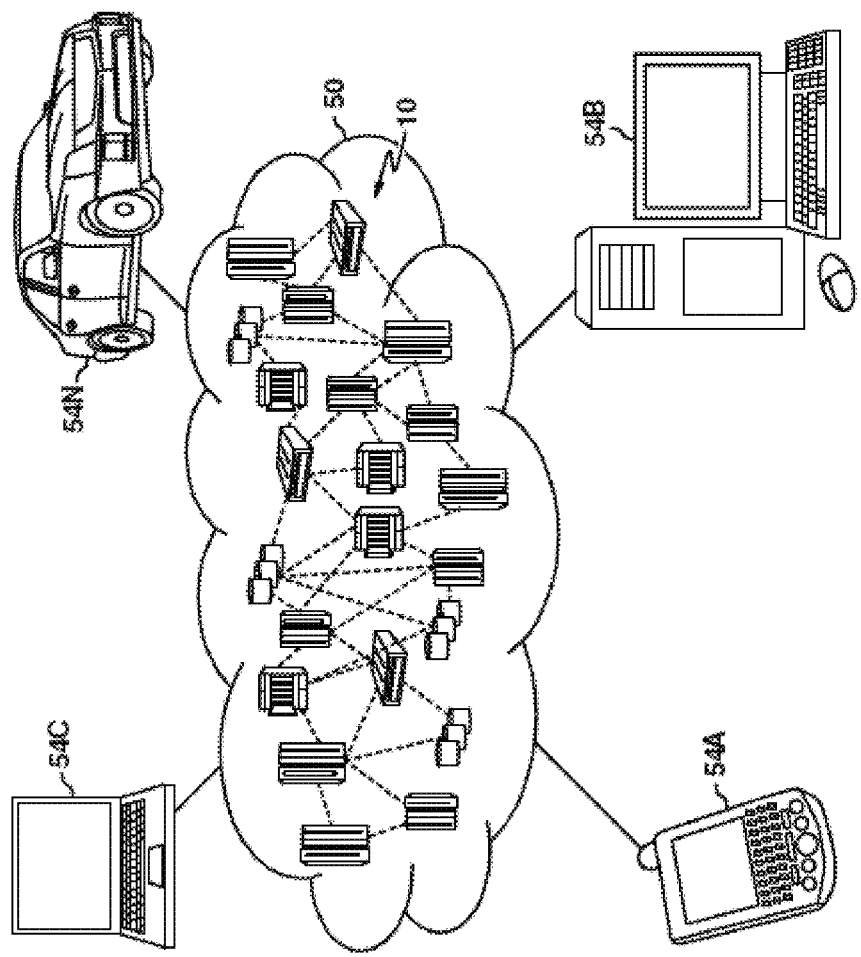
FIG. 7 is illustrative of a cloud computing environment.
Figure 8:
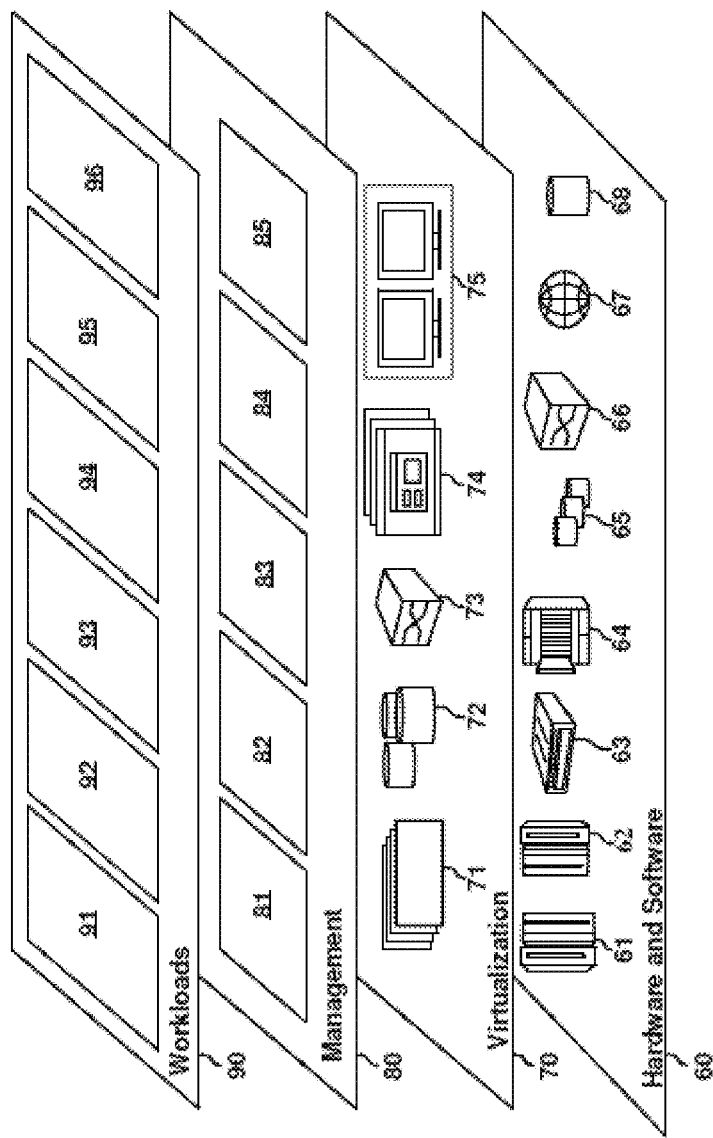
FIG. 8 depicts a set of functional abstraction layers provided in the cloud computing environment.
Figure 9:
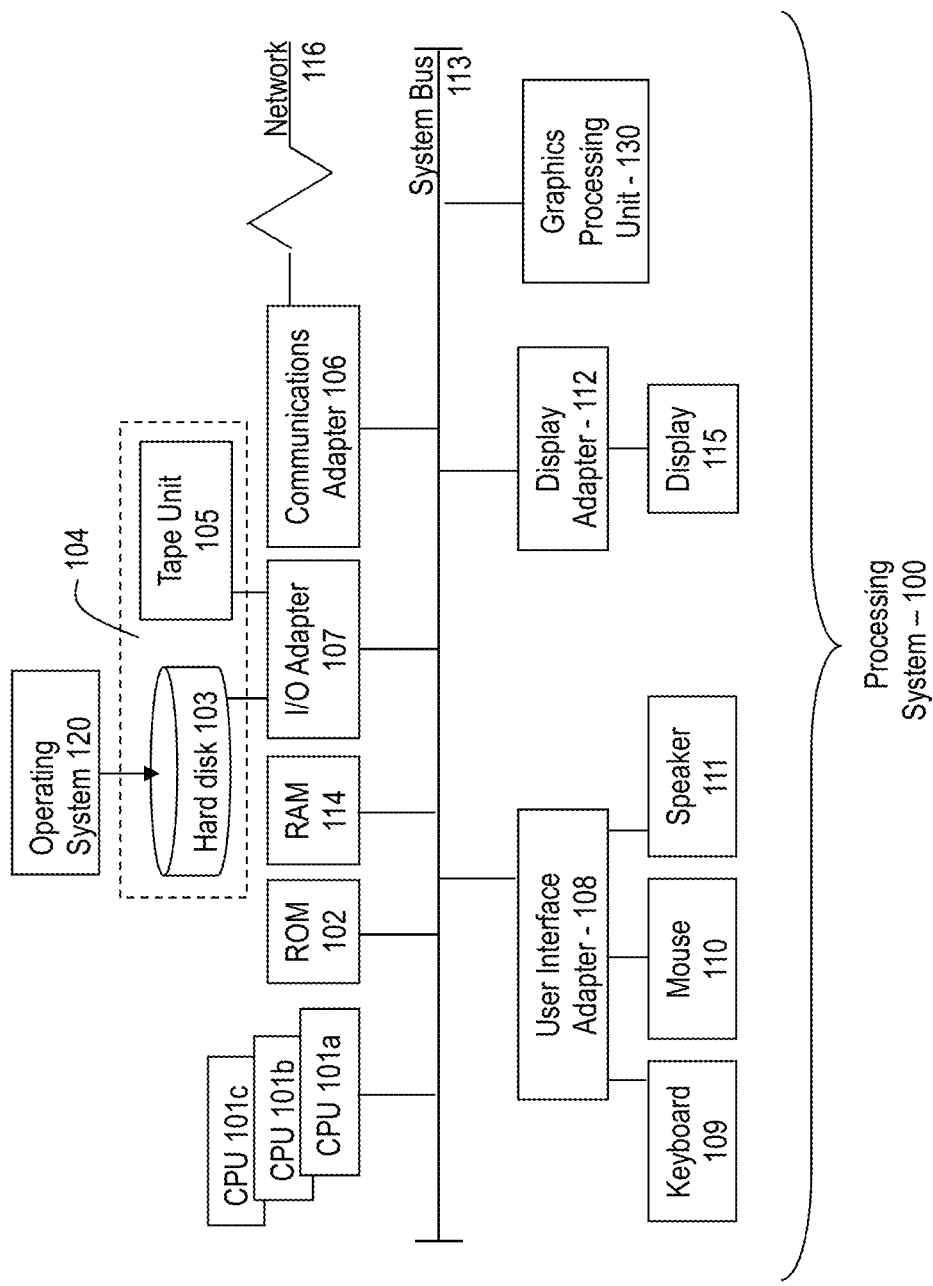
FIG. 9 depicts an embodiment of a processing system for implementing the teachings herein.

If a large number of queries are being directed to the system 200 by users wanting to know particulars about only the use of antibiotics by doctors 404 and 416 and other doctors that see the patients who take antibiotics, the system may be further simplified to that shown in the FIG. 6. In the FIG. 6, the nodes that represented the patients 406, 410 and 422 have now become primary nodes while the doctors 404, 416 and 420 are now represented by the edges of the graph-based data structure. Edge (404, 416) is bolded because it represents doctors who prescribe antibiotics, while edge (404, 420) is dotted because it represents another doctor 420 that has worked on one of doctor 404's patient (410). The FIG. 6 can be seen to be significantly simpler and more intuitive when the attributes of nodes and edges from the FIGS. 4 and 5 are changed.

The result of these alterations to the underlying data structure is that the graph-based data structure can adapt to better support current and new questions. The system learns which connections hold the most valuable, real-world knowledge and exposes those connections as directly as possible. These updates are performed automatically, either as relevant patterns are detected, or as the processing and storage resources become available to support the added complexity. Overall, the system allows the underlying data abstraction to be improved in situ, without constant collaboration between the technical experts and the domain experts. Using this method of backfilling structure, the graph-based data structure automatically adapts to be able to efficiently deliver what users need from it. The system may be used in variety of operations such as hospitals, police departments, homeland security departments, school and university systems, agricultural planning, and the like. The system may be used for cases including matchmaking, network management, software analytics, scientific research, routing, organizational and project management, recommendations, social networks, and more.

The graph-based data structure 200 disclosed herein is exemplified by the following non-limiting examples.

Example 1

A city, for example, may be viewed as an attribute of say, a university node (i.e., the city in which that university is located). However, in some cases it might make more sense for each city to be its own node in the graph, and for the location of a university to be represented by an edge to that city node. Flipping the notion of nodes and edges entirely can produce a more intuitive graph. In a similar manner revisiting the criteria (the abstractions) for what constitutes a node and an edge can produce more intuitive graph-based data structures. Using the manner in which users use a graph-based data structure to create new criteria is another way of producing more intuitive graphs.

Example 2

This example deals with doctors. Suppose that doctors must frequently determine which treatments can be prescribed based on a patient's insurance provider. However, in the initial graph abstraction, insurance providers and treatments are only connected through patients. The system observes users performing frequent pivots from treatments, to patients, to insurance providers, and back. When this pattern reaches a certain threshold of usage, the system automatically adds a set of edges that directly connect the insurance providers with the prescribed treatments. This allows users to move directly between these elements, and make correlations without having to pivot through the patient nodes.

Example 3

Suppose that administrators at a university are frequently trying to pair students with professors from their home country. In the data system, the home countries of both students and professors are stored as an attribute of those nodes. The system observes users frequently using this attribute to correlate these two types of nodes. In response the system pushes the country attribute out into the graph-based data structure as actual nodes, allowing users to make direct pivots between students and professors from the same country.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A system for updating a graph-based data structure comprising a plurality of nodes and one or more edges connecting the plurality of nodes, the system comprising:
   a processor that hosts an algorithm to incrementally update underlying data and abstractions of the graph-based data structure based at least in part on: i) a first set of queries received from a first group of one or more users, ii) a second set of queries presented to a second group of one or more users, and iii) a set of responses to the second set of queries, wherein the second set of queries comprises at least one query in the first set of queries that is selected for inclusion in the second set of queries based at least in part on a number of users in the first group of one or more users from whom the at least one query was received;
   a user interface that is in two-way operative communication with the processor, wherein the user interface is operative to present the second set of queries as the second group of one or more users traverses the graph-based data structure; and
   a memory in communication with the processor, wherein the memory stores computer-executable instructions of the algorithm,
   wherein the processor is configured to retrieve the computer-executable instructions and execute the algorithm to:
   cause the user interface to present the second set of queries to the second group of one or more users;
   determine patterns of access of the graph-based data structure by the second group of one or more users based at least in part on the set of responses one or more traversals of the graph-based data structure by the second group of one or more users;

determine that the number of users in the first group of one or more users from whom the at least one query was received is above threshold number of users;

develop additional queries around the at least one query; and update the graph-based data structure based at least in part on the patterns of access.

2. The system of claim 1, wherein the processor is further configured to execute the algorithm to test the at least one query prior to selecting the at least one query for inclusion in the second set of queries.

3. The system of claim 2, wherein the processor is configured to execute the algorithm to test the at least one query by developing additional graph-based data structures for presentation to the second set of one or more users.

4. The system of claim 1, wherein the at least one query is a first at least one query and the threshold number of users is a first threshold number of users, and wherein the algorithm is further configured to execute the algorithm to:

determine that a number of users in the first group of one or more users from whom a second at least one query was received is above a second threshold number of users, wherein the second threshold number of users is greater than the first threshold number of users; and develop additional graph-based data structures for presentation to the second set of one or more users around the second at least one query.

5. The system of claim 1, wherein the at least one query is a first at least one query, and wherein the algorithm is further configured to execute the algorithm to:

determine that a number of users in the first group of one or more users from whom a second at least one query was received is less than the threshold number of users; and store the second at least one query in a database for future aggregation with one or more additional queries.

6. The system of claim 1, wherein the processor is configured to execute the algorithm to update the graph-based data structure based at least in part on the patterns of access by at least one of: i) eliminating at least one of the plurality of nodes from the graph-based data structure, ii) eliminating at least one of the one or more edges from the graph-based data structure, or iii) converting a node to an edge.

7. The system of claim 1, wherein the processor is further configured to execute the algorithm to determine the patterns of access based at least in part at least one of a pivot operation or a filtering operation.

8. A method, comprising:

executing an algorithm to incrementally updating underlying data and abstractions for a graph-based data structure comprising a plurality of nodes and one or more edges connecting the plurality of nodes based at least in part on i) a first set of queries received from a first group of one or more users, ii) a second set of queries presented to a second group of one or more users, and iii) a set of responses to the second set of queries, wherein the second set of queries comprises at least one query in the first set of queries that is selected for inclusion in the second set of queries based at least in part on a number of users in the first group of one or more users from whom the at least one query was received, and wherein executing an algorithm comprises:

causing a user interface that is in two-way operative communication with a processor that hosts the algorithm to present the second set of queries to the second group of one or more users, wherein the processor is in communication with a memory that stores computer-executable instructions of the algorithm;

determining patterns of access of the graph-based data structure by the second group of one or more users based at least in part on the set of responses and one or more traversals of the graph-based data structure by the second group of one or more users;

determining that the number of users in the first group of one or more users from whom the at least one query was received is above threshold number of users; and developing additional queries around the at least one query; and updating the graph-based data structure based at least in part on the patterns of access.

9. The method of claim 8, wherein executing the algorithm comprises testing the at least one query prior to selecting the at least one query for inclusion in the second set of queries, and wherein testing the at least one query comprises developing additional graph-based data structures for presentation to the second set of one or more users.

10. The method of claim 8, wherein the at least one query is a first at least one query and the threshold number of users is a first threshold number of users, and wherein executing the algorithm comprises:

determining that a number of users in the first group of one or more users from whom a second at least one query was received is above a second threshold number of users, wherein the second threshold number of users is greater than the first threshold number of users; and developing additional graph-based data structures for presentation to the second set of one or more users around the second at least one query.

11. The method of claim 8, wherein the at least one query is a first at least one query, and wherein the executing the algorithm comprises:

determining that a number of users in the first group of one or more users from whom a second at least one query was received is less than the threshold number of users; and storing the second at least one query in a database for future aggregation with one or more additional queries.

12. The method of claim 8, wherein updating the graph-based data structure based at least in part on the patterns of access comprise by at least one of: i) eliminating at least one of the plurality of nodes from the graph-based data structure, ii) eliminating at least one of the one or more edges from the graph-based data structure, or iii) converting a node to an edge.

13. The method of claim 8, wherein determining the patterns of access comprises determining the patterns of access based at least in part at least one of a pivot operation or a filtering operation.

14. A computer program product comprising a non-transitory computer-readable storage medium readable by a processing circuit, the storage-medium storing instructions executable by the processing circuit to perform a method, the method comprising:

executing an algorithm to incrementally updating underlying data and abstractions for a graph-based data structure comprising a plurality of nodes and one or more edges connecting the plurality of nodes based at least in part on a first set of queries received from a first group of one or more users, ii) a second set of queries presented to a second group of one or more users, and iii) a set of responses to the second set of queries, wherein the second set of queries comprises at least one query in the first set of queries that is selected for inclusion in the second set of queries based at least in part on a number of users in the first group of one or more users from whom the at least one query was received, and wherein executing an algorithm comprises:

causing a user interface that is in two-way operative communication with a processor that hosts the algorithm to present the second set of queries to the second group of one or more users, wherein the processor is in communication with a memory that stores computer-executable instructions of the algorithm;

determining patterns of access of the graph-based data structure by the second group of one or more users based at least in part on the set of responses and one or more traversals of the graph-based data structure by the second group of one or more users;

determine that the number of users in the first group of one or more users from whom the at least one query was received is above threshold number of users;

develop additional queries around the at least one query; and updating the graph-based data structure based at least in part on the patterns of access.

15. The computer program product of claim 14, wherein updating the graph-based data structure based at least in part on the patterns of access comprise by at least one of: i) eliminating at least one of the plurality of nodes from the graph-based data structure, ii) eliminating at least one of the one or more edges from the graph-based data structure, or iii) converting a node to an edge.

* * * * *